Patented Oct. 28, 1947

2,429,835

UNITED STATES PATENT OFFICE 2,429,835

N[1] (ALPHA, ALPHA-DIMETHYL-, BETA-PHENYL-PROPIONYL) SULFANILAMIDES

Henry Martin and Hans Gysin, Basel, Switzerland, assignors to J. R. Geigy A. G., Basel, Switzerland, a Swiss firm No Drawing. Application August 24, 1944, Serial No. 551,074. In Switzerland September 14, 1943

4 Claims. (Cl. 260—397.7)

In Letters Patent (Ser. No. 456,942) a process for the production of p-aminobenzene-sulfonacylamides has been disclosed consisting in that sulfonamides of the benzene series or their salts, which contain a nitrogen-containing group in p-position, are caused to react with unsaturated branched, aliphatic carboxylic acids or their functional derivatives respectively, if necessary in the presence of catalysts or acid-binding agents, and that the p-positioned nitrogen group is if desired, converted into an amino group. According to a special modification of this method the starting materials are benzene-sulfochlorides which are substituted in a corresponding manner, these benzene-sulfochlorides being then condensed with the amides of the defined carboxylic acids.

We have now found that especially valuable p-amino-benzene-sulfoacylamides of the general formula

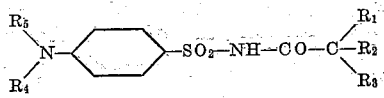

wherein $R_1$, $R_2$ and $R_3$ mean the same or different saturated or unsaturated aliphatic, cycloaliphatic, araliphatic or aromatic radicals (with the condition that the total of the C-atoms present in $R_1+R_2+R_3$ must be higher than 3),
$R_4$ represents hydrogen, alkyl or aralkyl, and
$R_5$ means hydrogen or alkyl, are obtained by causing sulfonamides of the benzene series containing in p-position to the sulfonamide group a nitrogen-containing group capable of being converted into an amino group to react with carboxylic acids of the general formula

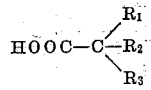

wherein $R_1$, $R_2$ and $R_3$ have the above meaning, or with reactive functional derivatives thereof and if desired converting the p-positioned, nitrogen-containing group into an amino group. Compounds of this nature have not yet become known heretofore; they are distinguished from the known p-amino-benzene-sulfonacylamides by their improved and superior efficacy against infection promoters and by their lower toxicity.

As sulfonamides of the benzene series which in the p-position to the sulfonamide group contain a nitrogen-containing group, may be mentioned: p-aminobenzene-sulfonamide, p-acylaminobenzene-sulfonamides, p-nitrobenzene sulfonamides and the like. The nitro group may be replaced by any other group, capable of being converted by reduction into the amino group, for example by the nitroso, azo, azoxy or hydrazo group.

Azomethine- and acyl-amino groups can be converted into amino groups by hydrolysis. It is advantageous to select from the acyl radicals those which are easily capable of being split off again. Such radicals are for example the acetyl or the carbomethoxy radicals, which are easily split off again by a hydrolytic treatment without affecting the acylated sulfonamide group.

The sulfonamides of the benzene series, substituted in the p-position by a nitrogen-containing group, may be used as such, or in the form of their salts, for example sodium p-nitrobenzene sulfonamide or potassium p-acetylaminobenzene sulfonamide. The reaction with the acylating agents may also be carried out in the usual way in the presence of bases, such as pyridine, dimethyl aniline and so on.

As carboxylic acids of the general formula

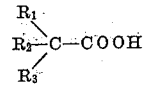

wherein $R_1$, $R_2$ and $R_3$ correspond to the above definition, come into consideration low molecular as well as high molecular carboxylic acids. For example $R_1$ to $R_3$ can represent methyl, ethyl, propyl, isopropyl, butyl, isobutyl, sec. butyl, allyl, crotyl, amyl, isoamyl, hexyl, isohexyl, heptyl, isoheptyl, octyl, isooctyl, nonyl, isononyl, etc. Among these purely aliphatic acids may be enumerated for instance: $\alpha$:$\alpha$-dimethyl-$\alpha$-ethyl-, $\alpha$:$\alpha$-dimethyl-$\alpha$-propyl-, $\alpha$:$\alpha$-dimethyl-$\alpha$-butyl-, $\alpha$:$\alpha$-dimethyl-$\alpha$-isobutyl-, $\alpha$:$\alpha$-dimethyl-$\alpha$-n-amyl-, $\alpha$:$\alpha$-dimethyl-$\alpha$-isoamyl-, $\alpha$:$\alpha$-dimethyl-$\alpha$-hexyl-, $\alpha$:$\alpha$-dimethyl-$\alpha$-heptyl-, $\alpha$:$\alpha$-dimethyl-$\alpha$-octyl-, $\alpha$:$\alpha$-dimethyl-$\alpha$-dodecyl-acetic acid, etc., or $\alpha$:$\alpha$-diethyl-$\alpha$-methyl-, $\alpha$:$\alpha$:$\alpha$-triethyl-, $\alpha$:$\alpha$-diethyl-$\alpha$-propyl-, $\alpha$:$\alpha$-diethyl-$\alpha$-butyl-, $\alpha$:$\alpha$-diethyl-$\alpha$-amyl-, $\alpha$:$\alpha$-diethyl-$\alpha$-hexyl-, or $\alpha$:$\alpha$-diethyl-$\alpha$-heptyl-acetic acid and the like or $\alpha$-methyl-$\alpha$-ethyl-$\alpha$-propyl-acetic acid, $\alpha$-methyl-$\alpha$-ethyl-$\alpha$-allyl-acetic acid, $\alpha$-methyl-$\alpha$-ethyl-$\alpha$-butyl-acetic acid, $\alpha$-methyl-$\alpha$-ethyl-$\alpha$-amyl-acetic acid or $\alpha$-methyl-$\alpha$-ethyl-$\alpha$-hexyl-acetic acid, or also $\alpha$-methyl-$\alpha$:$\alpha$-dipropyl-acetic acid, $\alpha$-methyl-$\alpha$:$\alpha$-dibutyl-acetic acid, $\alpha$-methyl-$\alpha$:$\alpha$-diamyl-acetic acid, or $\alpha$-methyl-$\alpha$-propyl-$\alpha$-butyl-acetic acid, or $\alpha$:$\alpha$:$\alpha$-tripropyl-, $\alpha$:$\alpha$:$\alpha$-tributyl-, $\alpha$:$\alpha$:$\alpha$-triamyl-acetic acid, etc. As further examples the following compounds may be mentioned: α:α-dimethyl-α-allyl- or α:α-dimethyl-α-crotyl-acetic acid and the like. As high molecular acids may be mentioned for instance: α-methyl-α:α-diheptyl - acetic acid, α:α-dimethyl - lauric acid, α-α-dimethyl-α-ethylcaprylic a c i d, α:α-dimethyl-myristic a c i d, α:α-dimethylpalmitic acid, α:α-dimethyloleyl-acetic acid, etc. Beside these purely aliphatic acids there can also be used: α:α-dimethyl-α-benzyl-acetic acid, α-methyl-α-ethyl-benzyl-acetic acid, α:α-dimethyl - phenyl-ethyl - acetic acid, α:α-dimethyl-phenyl - acetic acid, α:α-dimethyl-tolyl-acetic a c i d, α:α-dimethyl-xylyl-acetic acid, α-ethyl-α-propyl-benzyl acetic acid, α:α - dimethyl -α- hexahydrophenyl-a c e t i c acid, α:α-dimethyl-α-hexahydrobenzyl-acetic acid, α-methyl-α:α-bicyclohexyl-a c e t i c acid, α:α-dimethylchaulmoogryl-acetic acid, etc. The said acids are partly described in the literature; if this is not the case the same can be obtained according to known methods.

A special modification of the present method, leading to the same products, consists in that benzene sulfohalides which contain in p-position a nitrogen-containing group are condensed with salts of amides of the general formula

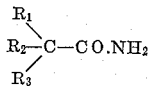

wherein $R_1$, $R_2$ and $R_3$ correspond to the meaning given in the introductory part, and that the p-positioned group is if desired converted into a free amino group.

The present invention is now illustrated, but not limited, by the following examples, wherein the parts are by weight.

*Example 1*

38.1 parts of α-methyl-α-(n-propyl)-α-(n-butyl)-acetic acid chloride are boiled under reflux for several hours with 200 parts of chlorobenzene, 1.5 parts of copper powder and with 42.8 parts of p-acetylaminobenzene-sulfonamide. The reaction mass is introduced under stirring into a dilute sodium carbonate solution and subsequently filtered. The organic solvent is separated and the aqueous solution acidified, whereby the raw acetyl compound precipitates out. The same is heated for 1 hour to boiling with 20 parts of sodium hydroxide in 100 parts of water. After acidification, the p-aminobenzene-N-[α-methyl-α-(n-propyl)-α-(n-butyl)-acetyl]-sulfonamide is obtained which crystallises, after reprecipitation from a sodium carbonate solution, from methanol in beautiful, almost quadratic leaflets of melting point of 216°-217° C.

Instead of p-acetylaminobenzene sulfonamide, also its sodium salt is suitable for the condensation with α-methyl-α-(n-propyl)-α-(n-butyl)-acetyl chloride.

The same compound may quite well be produced for instance with p-nitrobenzene-sulfochloride and with α:α:α-methyl-propyl-butyl-acetamide and by a subsequent reduction or also from p-nitrobenzene-sulfonamide and α:α:α-methyl-propyl-butyl-acetyl chloride and by reduction according to Béchamp or according to another method.

*Example 2*

32.5 parts of α:α-dimethyl-α-(n-butyl)-acetyl-chloride are added dropwise to 23 parts of p-carbomethoxyamino-benzene-sulfonamide in 200 parts of chlorobenzene and the whole is heated under reflux for several hours with 1 part of copper powder. After expelling of the chlorobenzene by means of steam the carbomethoxy derivative is dissolved in a cold sodium carbonate solution, then a little quantity of unconsumed starting material is filtered off and the filtrate is poured onto ice and hydrochloric acid. By saponification with dilute caustic soda lye the p-aminobenzene-N-[α:α-dimethyl-(n-butyl)-acetyl]-sulfonamide of the melting point of 199°-200° C. is obtained.

In an analogous manner the p-aminobenzene-N-(α:α-dipropyl-α-methyl-acetyl) - sulfonamide having the melting point of 227°-228° C. may also be produced.

*Example 3*

39.3 parts of α:α-dimethyl-α-benzylacetyl chloride are added dropwise, while stirring and cooling, to 40.4 parts of p-nitrobenzene-sulfonamide in 250 parts of pyridine. Then the reaction mass is heated for some hours to 60° C. and subsequently poured onto ice+hydrochloric acid, the nitro derivative being precipitated first in a somewhat sticky form, but crystallising on standing The condensation can also be carried out in nitrobenzene in the presence of anhydrous aluminium chloride or phosphorus pentoxide. After precipitation from a sodium carbonate solution reduction is effected with iron and acetic acid, according to Béchamp, whereby the p-aminobenzene-N - (α:α-dimethyl-α-benzyl-acetyl) - sulfonamide is obtained. By recrystallisation from alcohol and dioxane the product can be obtained in a quite pure form. Melting point 213° C.

*Example 4*

23.1 parts of α:α-dimethyl-α-(o-chlorobenzyl)-acetyl chloride in 150 parts of chlorobenzene or in another inert solvent are boiled under reflux for some hours with 20.2 parts of p-nitrobenzene-sulfonamide and with 2 parts of copper powder. The chlorobenzene is subsequently distilled by means of steam and the residue introduced under stirring into a warm sodium carbonate solution. The solution is treated with animal charcoal and then filtered. From the filtrate the nitro compound is precipitated with acetic acid and reduced according to Béchamp. The so-obtained p-aminobenzene-N-[α:α-dimethyl-α-(o-chlorobenzyl)-acetyl]-sulfonamide is recrystallised from alcohol and has then a melting point of 158° C.

In a very analogous manner the following compounds may be prepared: p-aminobenzene-N-[α:α-dimethyl-α-(m-methyl-benzyl)-acetyl]-sulfonamide, melting point 165° C., p-aminobenzene-N-[α:α-dimethyl-α-(p-methylbenzyl)-acetyl]-sulfonamide, melting point 215° C., p-aminobenzene-N-[α:α-dimethyl-α-(m-chlorobenzyl)-acetyl]-sulfonamide, melting point 154° C., and p-aminobenzene-N - [α:α-dimethyl-α- (p-chlorobenzyl)-acetyl]-sulfonamide, melting point 212° C.

What we claim is:

1. A p-aminobenzene-sulfonamide of the formula

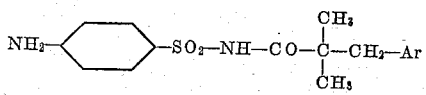

wherein Ar represents a member selected from the group consisting of phenyl, methylphenyl and chlorophenyl radicals.

2. The p-aminobenzene-N-(α:α-dimethyl-α-benzyl-acetyl)-sulfonamide.

3. The p-aminobenzene-N-[α:α-dimethyl-α-(m-methyl-benzyl)-acetyl]-sulfonamide.
4. The p-aminobenzene-N-[α:α-dimethyl-α-(p-chloro-benzyl)-acetyl]-sulfonamide.

HENRY MARTIN.
HANS GYSIN.

REFERENCES CITED

The following references are of record in the file of this patent:

FOREIGN PATENTS

| Number | Country | Date |
|---|---|---|
| 111,230 | Australia | Aug. 22, 1940 |

OTHER REFERENCES

Crossley et al., Jour. Am. Chem. Soc., vol. 61, Oct. 1939, pp. 2950–2955.